(12) United States Patent
Böcker et al.

(10) Patent No.: US 8,814,014 B2
(45) Date of Patent: Aug. 26, 2014

(54) DEVICE FOR MOUNTING ATTACHMENT EXTERNALLY SUPPORTING AGAINST BODY OUTER PANEL OF VEHICLE BODY ON BODY STRUCTURE

(75) Inventors: Frank Böcker, Hagen (DE); Jörg Schmitz, Wuppertal (DE); Reinhold Rothstein, Wuppertal (DE); Rainer Steffens, Sprockhöval (DE); Klaus Kolodziej, Wuppertal (DE)

(73) Assignee: JAC Products, Inc., Saline, MI (US)

( * ) Notice: Subject to any disclaimer, the term of this patent is extended or adjusted under 35 U.S.C. 154(b) by 160 days.

(21) Appl. No.: 13/468,673

(22) Filed: May 10, 2012
(Under 37 CFR 1.47)

(65) Prior Publication Data
US 2013/0299539 A1    Nov. 14, 2013

(51) Int. Cl.
*B60R 9/00*    (2006.01)

(52) U.S. Cl.
USPC .................. 224/326; 224/557; 224/309

(58) Field of Classification Search
CPC ......... B60R 9/04; B62D 25/06; B62D 27/065
USPC .................. 224/309–327, 557; 296/210
See application file for complete search history.

(56) References Cited

FOREIGN PATENT DOCUMENTS

DE    102008017859    10/2009
EP    0950569    10/1999

*Primary Examiner* — Justin Larson
*Assistant Examiner* — Phillip Schmidt
(74) *Attorney, Agent, or Firm* — Harness, Dickey & Pierce, P.L.C.

(57) ABSTRACT

A vehicle article carrier system for clamping a roof rail to a roof of a vehicle. The system enables a variation in the spacing between an outer layer of the roof and an underlying roof structure to be taken up when clamping a roof rail to the vehicle roof without causing deformation of the outer layer of the vehicle roof.

22 Claims, 8 Drawing Sheets

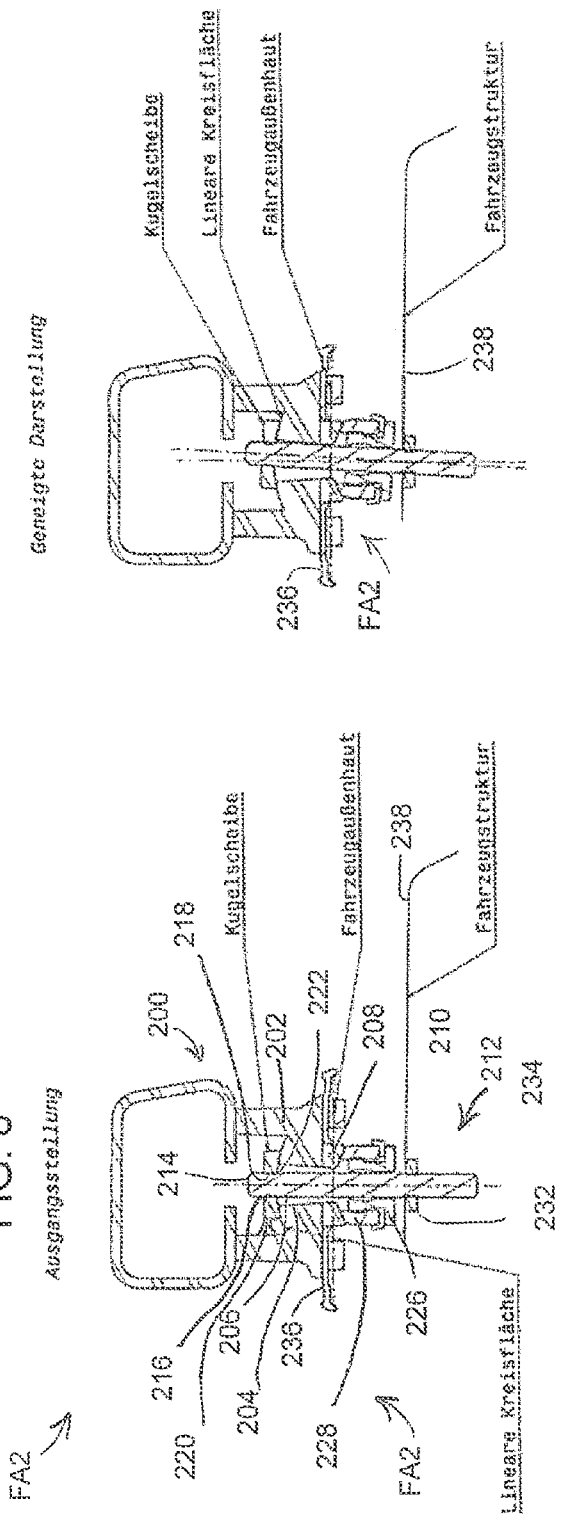

1

DEVICE FOR MOUNTING ATTACHMENT EXTERNALLY SUPPORTING AGAINST BODY OUTER PANEL OF VEHICLE BODY ON BODY STRUCTURE

FIELD

The invention relates to vehicle article carriers, and more particularly to an add-on component, such as a roof rail of a vehicle article carrier assembly, having a fastener assembly for fastening the support rail to an automotive body outer skin of a vehicle roof, and where the fastener assembly has a construction enabling it to accommodate tolerances in the structure making up the vehicle roof.

BACKGROUND

With many vehicle roofs on present day automotive vehicles, an outer metallic skin of the roof structure is too thin to offer adequate stability for fastening add-on components such as a roof rail, sometimes referred to as a "profile", which will be required to support the loads associated with articles being transported on the roof rail. As a result, such add-on parts as roof rails are preferably mounted in areas of the roof structure where underlying reinforcing body structures such as frames, roof flanges or bars are located. The roof rails are supported on the outer body sheet metal on the outside but are anchored on the rigid body structure situated beneath it. However, due to manufacturing tolerances, the distance between the outer skin of the vehicle roof and the underlying structure which is situated further toward the inside of the vehicle, but which needs to be attached to in order to securely affix the roof rail to the outer body surface, is subject to dimensional fluctuations.

Fastening arrangements such as those disclosed in EP 0 950 569 B1 and EP 1 705 066 B1, which can compensate for certain tolerances in the distance between the outer skin and the structure arranged further toward the inside of the vehicle, are thus already known. For reliable fastening of the roof rail, the roof rail may be provided with a retaining foot, which can be passed through a mounting opening in the outer skin of the roof and is then attached to the body structure from the inside of the vehicle with the help of clamping means. A bolt having a screw can be used to act on a spreading sleeve in the retaining foot, and thus this arrangement may be used to compensate for the spacing tolerances between the outer skin and the underlying body structure.

With the fastening arrangement according to EP 0 950 569 B1, the add-on part (e.g., roof rail) is supported on the automotive body outer skin without prestress due to its construction unless the add-on part is acted upon by a prestressing force during the tightening of the screw connection from above, i.e., manually. However, this makes the assembly process more difficult because at the same time a pressure must be exerted from the outside onto the add-on part while the screw connection must be tightened from the inside. Therefore, two people must work together in practice to accomplish this assembly, one person applying a force to a portion of the add-on part from the outside while a person on the inside of the vehicle tightens the screw that clamps the add-on part to the vehicle roof.

However, the fastening arrangement according to EP 1 705 066 B1 is designed so that it can be mounted by one person alone while achieving a prestress of the add-on part against the vehicle body outer sheet metal. For this purpose, the end of the bolt on the outer end of the body end is designed as an enlarged retaining head which stretches a spring element between itself and the retaining foot. When the bolt is tightened, the spring element is compressed, with the result being a prestressing force of the add-on part on the outer skin of the vehicle. The prestress is an advantage, but the size of the stress depends to a great extent on the distance between the outer skin of the vehicle body and the body structure arranged between it. The greater this distance, the greater also the pressure of the add-on part on the outside of the vehicle body after assembly. An excessive pressure of the add-on part on the outer metal roof surface can cause a slight concave depression to become visible in the roof when the attachment is effected, and such a condition is highly undesirable from an aesthetic viewpoint.

Thus, one important consideration, which the present invention meets, is therefore to permit prestressing of the add-on part (roof rail) against the outside surface of the vehicle roof independently of the dimensional tolerances in the roof structure, while also permitting simple and convenient assembly operation to be carried out by a single individual.

SUMMARY

This section provides a general summary of the disclosure, and is not a comprehensive disclosure of its full scope or all of its features.

In one aspect the present disclosure relates to a vehicle article carrier system. The vehicle article carrier system may comprise a roof rail adapted to be fastened to an outer body surface of a vehicle roof, wherein the outer body surface has an outer layer and an additional structural layer disposed elevationally below the outer layer. The roof rail may include a fastening assembly. The fastening assembly may include a bolt and a subassembly for cooperating with the bolt. The subassembly may include an element frictionally engaged with the bolt and able to move frictionally along a length of the bolt during a first predetermined degree of rotational movement of the bolt. This permits a degree of spacing between the outer layer and the additional structural layer to be taken up before the fastening assembly effects a clamping action. A component may be included which is adapted to move linearly along the bolt toward the additional structural layer during the first predetermined degree of rotational movement of the bolt, and also during a subsequent second predetermined degree of rotational movement of the bolt. During the second predetermined degree of rotational movement the bolt causes the component to be brought into contact with the additional structural layer to assist in generating the clamping action which clamps the roof rail to the vehicle roof.

In another aspect the present disclosure relates to a vehicle article carrier system. The system may comprise a roof rail adapted to be fastened to an outer body surface of a vehicle roof. The automotive body surface may have a recessed automotive body structure formed therein. The roof rail may include a retaining foot shaped to project into the recessed automotive body structure. The retaining foot may include a cavity in communication with a bore. A fastening assembly may be included which has a bolt that is dimensioned to project through the bore and through a hole in a wall portion of the recessed automotive body structure. The bolt and the retaining foot may include first cooperating structure to prevent the bolt from turning within the bore while still allowing the bolt to be moved axially within the bore. A spreader sleeve may be included and, configured to fit over a portion of the bolt. The bolt and the spreader sleeve may include second cooperative structure to cause the spreader sleeve to be expanded into frictional engagement within the cavity as the bolt is moved axially through the bore and the hole. A fastening element may be adapted to engage a first end of the bolt that causes axial movement of the bolt through the hole as, the fastening element is turned. A resistive element may be included which is adapted to frictionally engage with a second end of the bolt as the bolt is moved axially through the hole. The frictional engagement provides a generally constant resistive force as the bolt is axially moved through the hole and causes tightening of the roof rail against the outer body surface of the vehicle. The constant force remains constant regardless of spacing variations between the outer body surface and the wall portion of the recessed automotive body structure.

In another aspect the present disclosure relates to a vehicle article carrier system adapted to support articles above an outer body surface of a vehicle, wherein the outer body surface has at least one recessed automotive body structure formed therein. The system may include a pair of elongated roof rails adapted to be positioned adjacent the outer body surface of the vehicle, with at least one of the roof rails adapted to be positioned over the recessed automotive body structure when secured to the outer body surface. One of the roof rails may include a retaining foot shaped to project into the recessed automotive body structure. The retaining foot may include a cavity in communication with a bore. A fastening assembly may be provided which has a bolt, and the bolt may be dimensioned to project through the bore, through the cavity and through a hole in a wall portion of the recessed automotive body structure. The bolt and the retaining foot may include structure to prevent the bolt from turning within the bore while still allowing the bolt to be moved axially within the bore. A fastening element adapted to engage a first end of the bolt is used that causes axial movement of the bolt through the hole as the fastening element is turned. A washer having a hole is also incorporated, where the hole in the washer may be dimensioned such that the washer forms a resistive element when slid over a second end of the bolt, and such that the washer frictionally engages with the second end of the bolt as the bolt is moved axially through the hole. The frictional engagement provides a generally constant resistive force as the bolt is axially moved through the hole and causes tightening of the support rail against the outer body surface of the vehicle. The constant resistive force remains constant regardless of spacing variations between the outer body surface and the wall portion of the recessed automotive body structure.

In still another aspect the present disclosure relates to a vehicle article carrier system. The system may comprise a pair of roof rails adapted to be secured to an outer body surface of a vehicle roof, wherein the outer body surface has at least one recessed automotive body structure formed therein, with one of the roof rails adapted to be secured over the recessed automotive body structure. A plurality of fastening assemblies may be included along the length of the one roof rail. Each fastening assembly may include a retaining foot associated with the one of the roof rails which is shaped to project into the recessed automotive body structure. The retaining foot may include a cavity in communication with a bore. A bolt dimensioned to project through the bore and through a hole in a wall portion of the recessed automotive body structure may be included. The bolt and the retaining foot may include first cooperating structure to prevent the bolt from turning within the bore while still allowing the bolt to be moved axially within the bore. A spreader sleeve is may be included which is configured to fit over a portion of the bolt. The bolt and the spreader sleeve may include second cooperative structure to cause the spreader sleeve to be expanded into frictional engagement with the cavity as the bolt is moved axially through the bore and the hole. A fastening element may be included which is adapted to engage a first end of the bolt that causes axial movement of the bolt through the hole as the fastening element is turned. A resistive element may be included which is adapted to frictionally engage with a second end of the bolt as the bolt is moved axially through the hole. The frictional engagement may provide a generally constant resistive force as the bolt is axially moved through the hole and causes tightening of the roof rail against the outer body surface of the vehicle. The constant force remains constant regardless of spacing variations between the outer body surface and the wall portion of the recessed automotive body structure. The roof rail and its fastener assembly enables a single individual to tighten and secure the roof rail to the outer body surface of the vehicle by only tightening the fastening element.

Further areas of applicability will become apparent from the description provided herein. The description and specific examples in this summary are intended for purposes of illustration only and are not intended to limit the scope of the present disclosure.

DRAWINGS

Exemplary embodiments of fastening arrangements for add-on parts are described below on the basis of the respective drawings, in which:

FIGS. 8-13 show a fastener assembly FA2 in accordance with another embodiment of the present disclosure, wherein the fastener assembly FA2 allows a degree of axial misalignment between the holes in the metallic outer layer and the underlying rigid body structure of the roof structure that the profile is attached to.

DETAILED DESCRIPTION

Example embodiments will now be described more fully with reference to the accompanying drawings.

Figure 1:
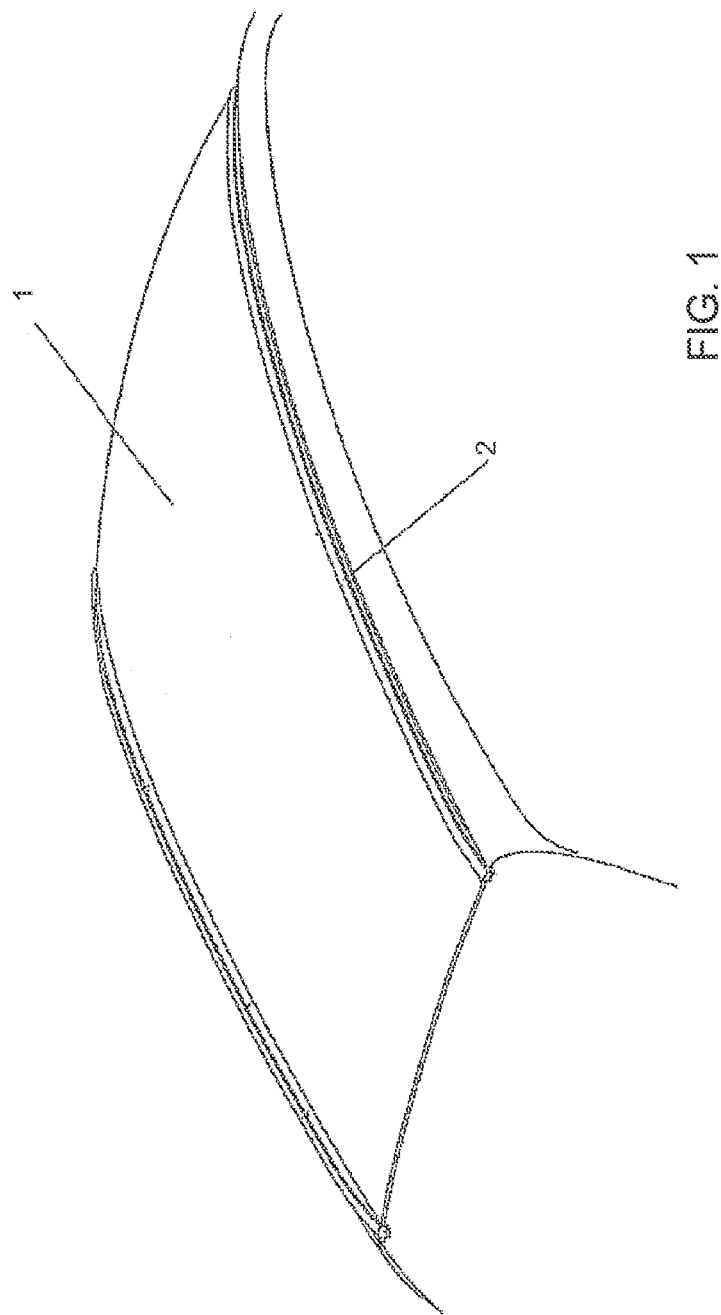
FIG. 1 shows a perspective view of a vehicle roof of a passenger vehicle with two add-on parts attached thereto, each in the form of a roof railing.

FIG. 1 shows the vehicle roof of a passenger vehicle with two roof rails (also known as profiles or support rails) positioned on a metal outer surface of a vehicle roof, with each running in the longitudinal direction of the vehicle. The roof rails 2 are supported on the outer sheet metal 1 of the vehicle roof on supporting feet typically at two or three locations and run at a certain distance from the outer sheet metal outside of these supporting feet. In the embodiment described here, the roof rails 2 are each positioned on a gasket which is sandwiched between the underside of its associated roof rail 2 and the outer sheet metal 1 of the vehicle body.

To attach functional elements, e.g., a roof luggage rack, a ski rack, a bicycle rack, etc., on the roof rails 2, the roof rails may be provided with undercuts or indentations in which the restraining elements of the respective carrier system engage in a form-fitting or frictionally engaged manner.

Figure 2A:
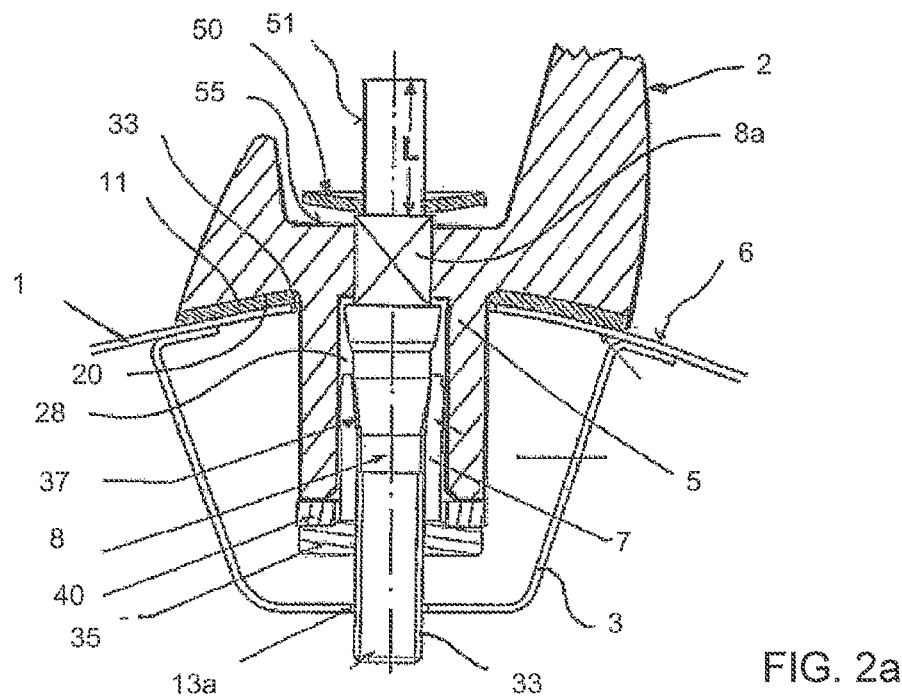
FIG. 2a shows a section through the vehicle body in the area of the add-on part including a device for fastening the add-on part, such that the objects are shown after preassembly but before the final fastening.
Figure 2B:
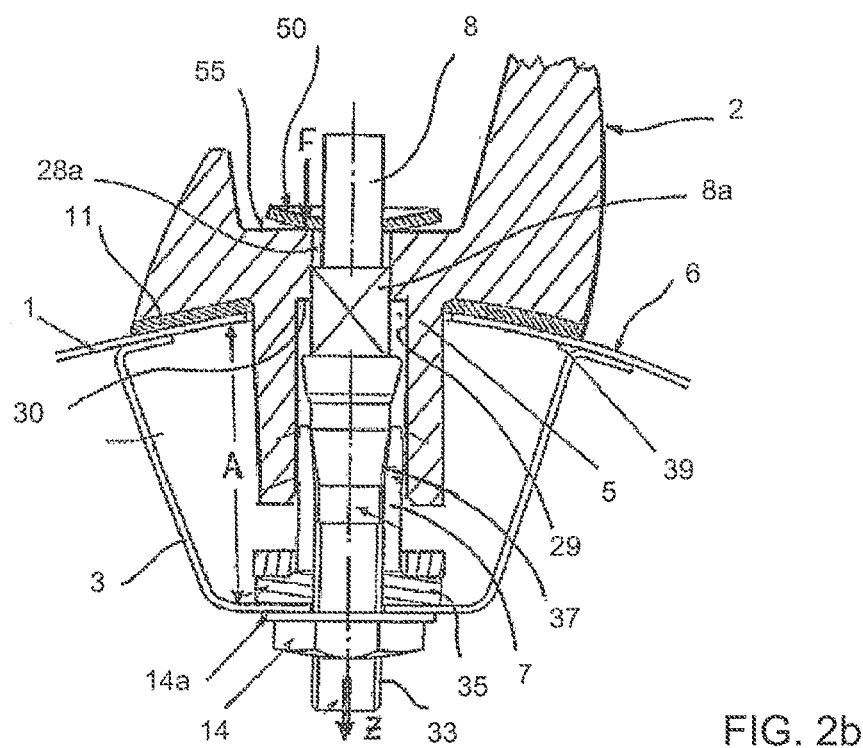
FIG. 2b shows a section according to FIG. 2a after the end of assembly.

FIG. 2*a* and FIG. 2*b* show a portion of the roof rail 2 in a section across the longitudinal direction of the vehicle. Several of the fastening assemblies FA of the present disclosure described herein are preferably provided over the entire length of the roof rail 2 for fastening to the automotive body roof structure. This positions the roof rail in a defined relationship to the exterior sheet metal 1 of the automotive body over its entire length. A flat gasket 11, preferably made of a flexible material, i.e., a material which will compress under pressure, is arranged between the base 12 of the roof rail 2 and the exterior side 6 of the exterior sheet metal 1 of the automotive body.

For anchoring the roof rail 2 on the automotive body, the thin-walled exterior sheet metal 1 used as well as the increased stiffness of an automotive body structure 3 which is beneath the exterior sheet metal 1 at a distance A. The automotive body structure 3 is often a welded section with a suitably high strength. The distance A between the exterior sheet metal 1 and the automotive body structure 3, however, is generally not exactly the same from one vehicle to the next due to manufacturing tolerances and variations, but instead is subject to certain fluctuations. Tolerance compensation is therefore necessary in anchoring the roof rail 2 on the automotive body structure 3. The arrangement described below is capable of such a tolerance equalization in a manner that is simple and convenient from the standpoint of assembly technology.

The fastening system "FA" shown in FIG. 2*a*, makes use of a depending retaining foot 5 which in this example is an integrally formed portion of the roof rail 2. The fastening system FA, after preliminary positioning, and in FIG. 2*b* after the end of assembly work, is comprised of a clamping element 7 designed as a spreading sleeve, a bolt 8 and a nut 14, which can be screwed on to the bolt 8, optionally with a washer 14*a*. In the embodiment described here, the retaining foot 5 is an integral part of the roof rail 2. However, the retaining foot 5 may also be designed as a separate component which is first attached to a portion of the roof rail 2 in a suitable manner, e.g., by a screw connection of the retaining foot 5 with the roof rail 2 which is designed in the manner of a section. Furthermore, several of the fastening systems FA described herein, preferably three to five such spaced apart fastening systems FA, may be provided on the roof rail 2 over its total length.

The retaining foot 5 of the roof rail 2 protrudes through an opening 13 present in the automotive body outer skin 1. An opening 13*a* in the vehicle body structure 3 is coaxial with this opening 13, i.e., aligned with it. A cavity 28, which is designed in part as a borehole and in part as an internal rectangle, is situated in the preferably cylindrical retaining foot 5. The cavity 28 of the vehicle body structure 3, facing the latter, may be designed as a cylindrical borehole 29. The cavity 28 including its square section 28*a* and the borehole 29 are aligned with one another and here jointly form a continuous opening through which the retaining foot 5 is designed with a bushing shape on the whole. The diameter of the cylindrical borehole 29 is larger than the transverse measure in the area of the square section 28*a*, thus forming a step 30 at the transition from the borehole 29 to the square section 28*a*.

The clamping element 7, which is designed as a spreading sleeve, is inserted into the borehole 29. The elongated bolt 8 passes through the clamping element 7. The bolt reaches through the opening 13*a* in the vehicle body structure 3 at its end facing away from the add-on part 2. At this end, which is situated in the vehicle interior, the bolt 8 is provided with a thread 33 onto which a threaded nut 14 can be screwed. After the conclusion of assembly, as shown in FIG. 2*b*, the threaded nut 14 is supported against the stable vehicle body structure 3 from the inside of the vehicle with a washer 14*a* there between.

The bolt 8, which serves as a tension element, is arranged in the retaining foot 5 to be axially movable but not twisted. To this end the bolt 8 is provided with a corresponding square 8*a* on its longitudinal section passing through the square section 28*a*, so that the bolt 8 is secured against rotation in the cavity 28 of the retaining foot 5 but is still movable in the longitudinal direction. Instead of the square twist-proof design described here, differently designed twist-proofing may also be implemented, for example, a triangular or hexagonal shape or a polygon.

The spreading sleeve 7 has a bushing or sleeve-shaped longitudinal section as well as, outside of the retaining foot 5, a flange 35 which enlarges radially. The spreading sleeve 7 includes a plurality of individual spreading segments separated by longitudinal slots. To achieve a widening effect as required for spreading, the outside of the bolt 8 and the inside wall of the spreading sleeve 7 may both have mutually corresponding conical surfaces. Depending on the design, it is also possible to provide a cone only on the circumference of the bolt 8 or only on the inside of the spreading sleeve 7.

Based on the conicity 37 at the contact surfaces of the bolt 8 and the spreading sleeve 7, there is a radial expansion of the segments of the spreading sleeve 7 when there is tension on the bolt 8 in combination with a relative axial movement between the bolt 8 and the spreading sleeve 7. This causes the segments to be pressed against the borehole 29. To achieve a compensation of tolerance which is great enough for distances "A" which fluctuate due to the manufacturing tolerances, the length of the borehole 29 is greater than the length of the contact section on which the clamping element 7, which has been spread apart, is pressed against the wall of the borehole 29.

FIG. 2*a* shows an intermediate stage of assembly, in which the modular unit consisting of the roof rail 2 with the peg-shaped, depending retaining foot 5 designed thereon, the spreading sleeve 7 and the bolt 8 have been pushed from the exterior of the vehicle through the opening 13 in the outer skin 1 until the add-on part 2 is resting against the outside 6 of the automotive body outer skin 1 with the gasket 11 in between. In the intermediate state shown here, the spreading sleeve 7 still sits loosely in the borehole 29.

For the final assembly of the fastening assembly FA, as shown in FIG. 2*b*, the threaded nut 14 is placed on the thread 33 of the bolt, optionally with the washer 14*a*, and then tightened in place. Due to this tightening, first the bolt 8 and the spreading sleeve 7 are moved jointly toward the interior of the vehicle until the clearance which still remains between the bottom of the flange 35 and the outside of the vehicle body structure 3 approaches zero. Only then does further tightening of the threaded nut 14 result in an axial relative movement between the bolt 8 and the spreading sleeve 7, so that the sleeve 7 is widened (i.e., radially expanded) in the area of the cone 37 and presses against the bore 29 from the inside with frictional engagement. Therefore, the roof rail 2 is anchored permanently with respect to the outer skin 1 and the vehicle body structure 3.

A two-sided adhesive tape 40 may be provided between the end face of the peg-shaped section of the retaining foot 5 and the top side of the flange 35. This may serve as a securing mechanism to prevent the clamping element 7 from falling out during preassembly, i.e., while passing the drill unit through the opening 13 in the outer skin. When tightening the bolt 8 by means of the threaded nut 14, the adhesive tape 40 is loosened and is then no longer needed.

Outside of the vehicle, the bolt 8 has a smooth longitudinal section L with a constant cross section as seen over the length. The longitudinal section L preferably has a cylindrical cross section but may also have a polygonal cross section such as the adjacent rectangle 8a. A resistance element 50 in the form of a flat washer or a metal clip, for example, which is supported against the lateral surface 51 of the longitudinal section L under pressure and thus with frictional engagement, sits on the longitudinal section L. The frictional engagement results in the resistance element 50 being displaceable only by applying an axial force along the longitudinal section L. In order for the size of this friction-induced axial force to be independent of distance, the lateral surface 51 of the longitudinal section L should be smooth and at any rate should not have any excessively great unevenness.

The importance of the resistance element 50 can be seen in FIG. 2b. Tightening the threaded knot 14 causes a tension Z to act on the bolt 8. At the same time, at the underside of the resistance element 50, it is in contact with a surface 55 facing toward the outside of the vehicle in the area of the retaining foot 5. Any additional tension Z then causes an axial displacement of the resistance element 50 along the longitudinal section L. However, this displacement occurs against the definite frictional resistance between the resistance element 50 and the bolt 8, resulting in a prestress force F on the add-on part 2, causing a pressure, which is not great pressure but is constant, of the roof rail 2 against the outer skin 1. Under this pressure, the elastic gasket may be slightly compressed. It is especially important that the pressure is independent of the individual mounting situation and in particular is independent of the respective specific distance "A" between the outer skin 1 and the vehicle body structure 3. Thus even if the distance A turns out smaller in one case and larger in another case due to fluctuations in the production technology (i.e., manufacturing tolerances), the pressure of the add-on part 2 on the outer skin 1 is always the same.

Figure 3:
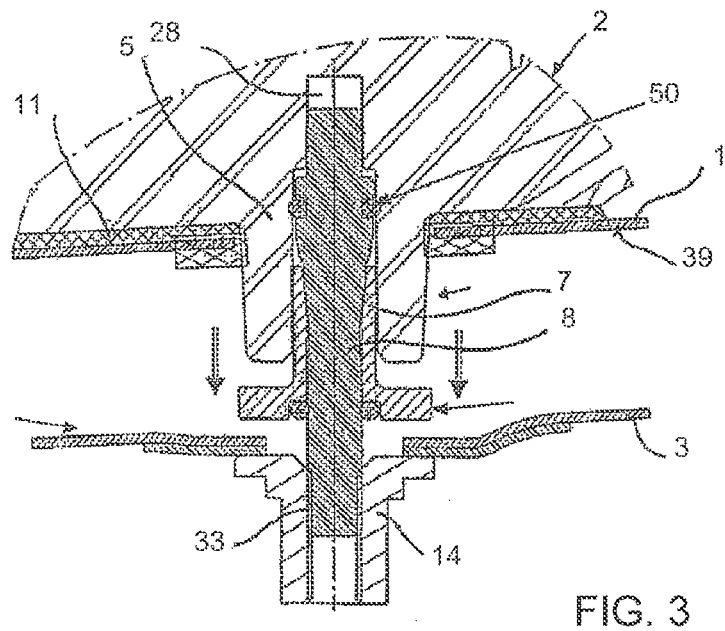
FIG. 3 shows a second embodiment of the fastening device.

In the second embodiment according to FIG. 3, a ring 50' sitting in a peripheral groove in the bolt 8, where it is secured axially, serves as a resistance element 50. The surrounding longitudinal section of the borehole 29 has a constant cross section, so that any relative axial movement between the bolt 8 and the borehole 29 in the retaining foot 5 is associated with a defined frictional resistance, which is in turn not dependent on the distance. It is additionally advantageous if the ring-shaped resistance element 50 forms a ring gasket between the bolt 8 and the borehole 29 at the same time and thus prevents moisture and dirt from passing through.

Figure 4:
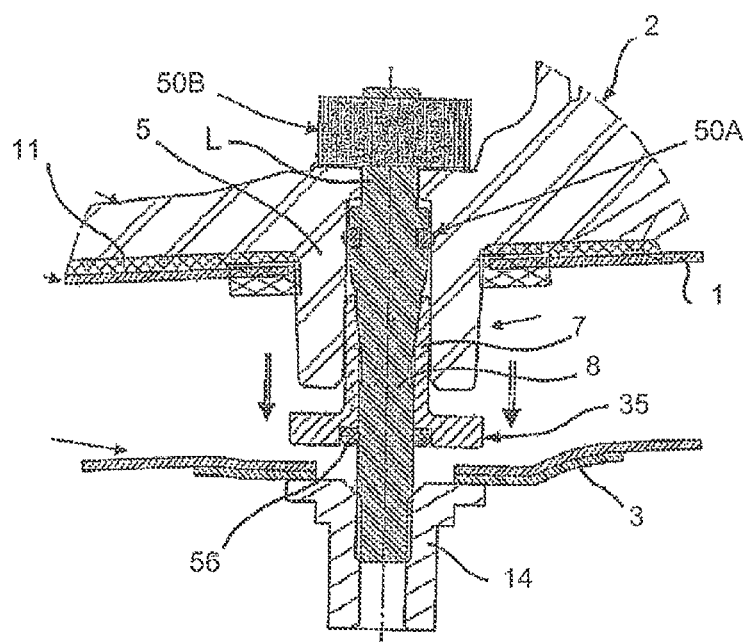
FIG. 4 shows a third embodiment of the fastening device.

The third exemplary embodiment according to FIG. 4 represents a combination of the two preceding embodiments. The ring 50A sitting in a circumferential groove in the bolt 8 serves here primarily as a sealing function, but at the same time may also partially assume the function of a frictional resistance element. In addition, a resistance element 50B is arranged on the outer longitudinal section of the bolt 8 and is supported against the surface 55 pointing toward the outside of the vehicle and sits on the longitudinal section L of the bolt 8 under a defined friction. Another ring gasket 56 is situated at the bottom of a recess on the spreading sleeve 7, thereby sealing the bolt 8 with respect to the spreading sleeve 7.

Figure 5:
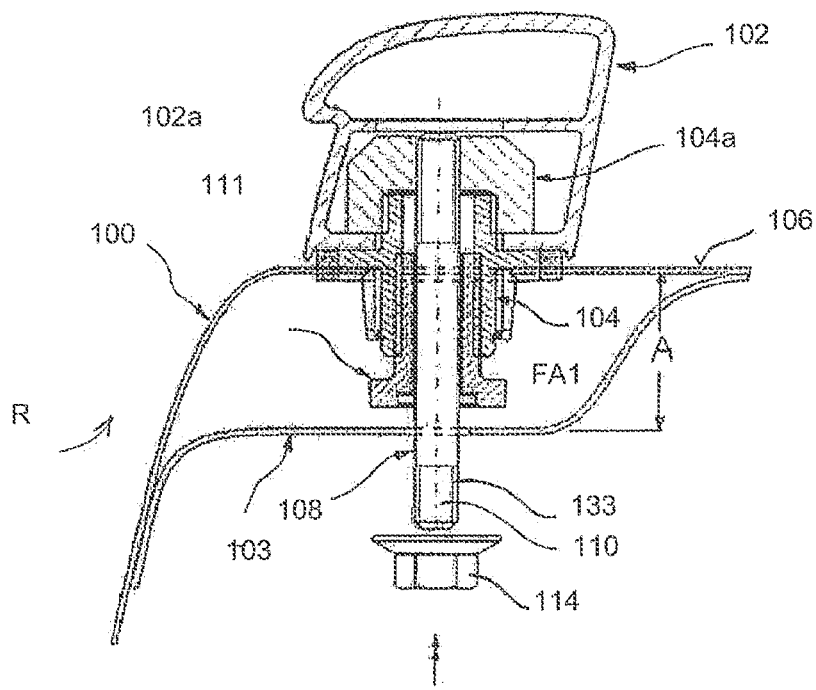
FIG. 5 shows a fastener assembly "FA1" in accordance with another embodiment of the present disclosure, wherein the embodiment FA1 is illustrated in cross section relative to the outer body vehicle body surface.
Figure 6:
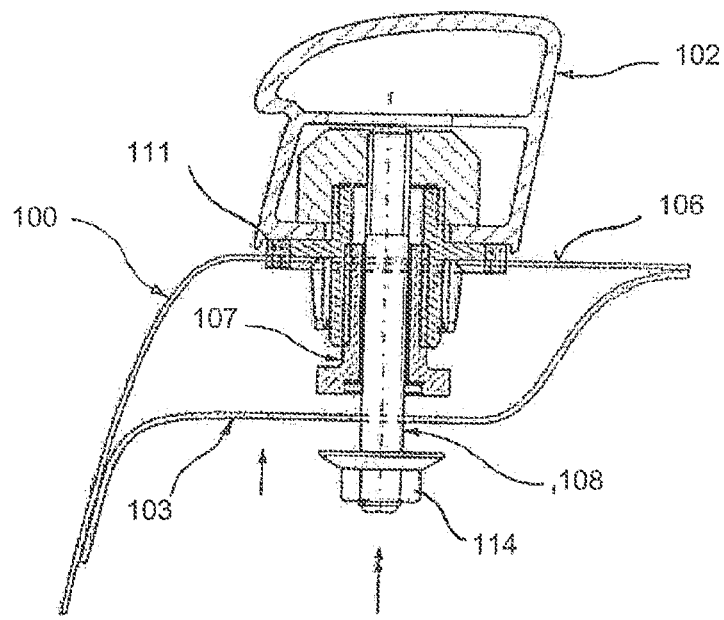
FIG. 6 shows the fastener assembly FA1 in an intermediate stage of assembly after screwing a nut on a bolt of the assembly FA1.
Figure 7:
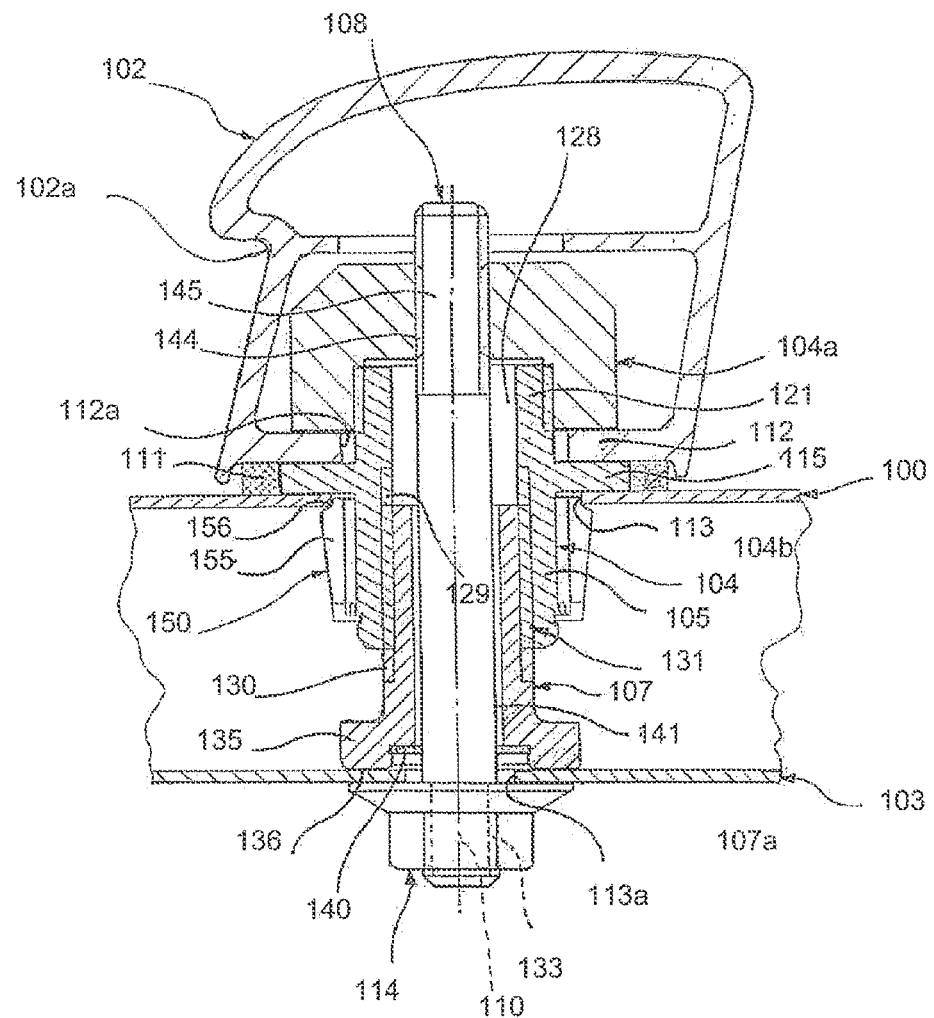
FIG. 7 shows the fastener assembly FA1 in a final stage of assembly secured to the vehicle roof.

Referring to FIGS. 5-7, another fastener assembly FA1 in accordance with the present disclosure is shown. The fastener assembly FA1 is designed as a portion of a roof rail 102 which is designed to be mounted externally on a vehicle body roof structure "R". Such roof rails 102 are sometimes called "profiles" or "support rails" and are supported on an outer sheet metal layer 100 of a vehicle roof. However, the profile may also be viewed, more broadly, simply as an "add on" component. Often a seal 111 is located on an outer sheet metal layer 100 of the vehicle roof structure "R", and underneath the roof rail 102 so as to be sandwiched between the roof structure R and the roof rail 102.

For enabling the securing of article supporting racks, ski racks, bicycle racks, etc., to the roof rail 102, the roof rail 102 may have a recess or undercut 102a. Fastening structure associated with the carrier system being used, such as a bike carrier or a ski rack, may positively or frictionally engage the undercut 102a, so the carrier system is securely connected to the roof rail 102 during operation of the vehicle.

A base 112 of the roof rail 102 is provided with openings 112a, which will be described in greater detail hereinafter in connection with other features of the fastener assembly FA1. If the roof rail 102 forms an elongated profile that spans a major portion of the longitudinal length of the vehicle roof R, then along its length the roof rail 102 may have several spaced apart openings 112a provided for accommodating a corresponding number of fastening assemblies FA1. This will enable the roof rail 102 to be secured to the sheet metal layer 100 of the roof R at several points over its entire length. As noted above, between the base 112 of the roof rail 102 and the outside 6 of the body outer panel 1, the compressible seal 111 can be arranged.

To anchor the roof rail 102, not just the thin outer sheet metal layer 100 is used, but also a body structure 103 that forms a stiff panel is used to effect the attachment. The body structure 103 also effectively forms a part of the roof structure R, and it is disposed below the sheet metal layer 100. The body structure 103 may be a welded or brazed section of sheet metal with correspondingly high strength. The distance A between the outer sheet metal body structure 100 and the body structure 103, however, is not always precisely the same, but has some variation due to manufacturing tolerances for the roof R itself. Therefore, in the anchoring of the roof rail 102 to the portions 100 and 103 of the roof R, some form of tolerance compensation is needed. The fastener assembly FA1 accomplishes such a tolerance compensation in a technically unique and efficient manner.

In FIG. 5 and FIG. 6 the fastener assembly FA1 is shown in an intermediate stage of assembly on the roof structure R. FIG. 7 shows the fastener assembly FA1 after completion of assembly to the roof structure R. Referring specifically to FIG. 7, the fastener assembly FA1 may be comprised of a two-part threaded member assembly 104, a sleeve 107, and a bolt 108. On a vehicle-inner end 110 of the bolt 108, a threaded nut 114 may be fastened by screwing the nut 114 on the end 110 of the bolt 108. The threaded member 104 has two main longitudinal sections 104a and 104b. One end of section 104b engages section 104a, wherein section 104a forms a rotationally fixed threaded element disposed within an interior portion of the roof rail 102. Portion 121 represents a threaded connecting area between the sections 104a and 104b, which together form a functional cooperating assembly. A second section 105 of section 104b extends below the outer metal layer 100 of the roof structure R. Between the threaded section 121 and section 105 is formed a flange 115, which extends radially outward from the section 105. The flange 115 is disposed between the base 112 and the metal layer 100 of the roof structure R.

After the installation on the vehicle roof structure R, the section 105 extends through the outer metal layer 100 and through an opening 113 in the outer metal layer 100. The opening 113 is coaxially aligned with an opening 113a provided in the body structure 103.

With the threaded section 121, a tight connection is formed between the section 104a and the section 104b. The section 104a rests with its bottom on the base 112 of the roof rail 102. Thus, the threaded member assembly 104 enables the base 112 of the roof rail 102 to be tightly clamped to flange 115 of the section 104b.

As noted above, the section 104a is not able to rotate within the interior area of the roof rail 102. This is achieved by a border of the section 104a resting against, or closely adjacent to, an immediately adjacent inner wall of an internal channel within the roof rail 102. Therefore, the section 104a cannot move rotationally while the section 104b is being threaded into the threaded connection 121 of the section 104a.

In an alternative implementation the threaded member 4 may have a one piece configuration, and it may be screwed directly into a threaded recess, threaded bore or threaded boss, inside an interior channel portion of the roof rail 102. In this example the threaded recess, bore or boss may be integrally formed with the material of the roof rail 102.

The threaded member assembly 104 has section 104b formed with a centrally located through opening 128 that extends through an entire length of the section 104b, thus enabling the section 104b to take on the configuration of a sleeve. The opening 128 is configured on at least a portion of its length with an internal thread 129 which engages a threaded portion 130 on an outer surface of a portion of the sleeve 107. Female threaded portion 129 and male threaded portion 130 thus form a common thread connecting section 131.

The bolt 108 passes through the threaded member assembly 104 and the sleeve 107. The bolt 108 projects with its end 110 facing away from the roof rail 102 and through the opening 113a of the body structure 103. End 110 of the bolt 108 is provided with a relatively short threaded section 133 onto which the nut 114 may be screwed onto. After assembly, as shown in FIG. 7, the threaded nut 114 is supported on the bolt end 110 against an inside surface of the rigid body structure 103.

The sleeve 107 has a longitudinal section with the external thread 130 and a radially enlarged flange 135. A surface portion of the enlarged flange 135 forms a support surface 136 which is positioned against an inner wall surface of the rigid body structure 103 when the sleeve is tightly secured within the roof structure R.

FIG. 5 shows the start of the assembly sequence. The roof rail 102 is first positioned over the opening 113. The assembly comprising the threaded sleeve 107, fastener member assembly 104, and the bolt 108 screwed at least partially into section 104a, is extended through the opening 113 in the metal roof layer 100. The bolt 108 projects through the hole 113a and the section 104b projects such that portion 105 is disposed below the metal layer 100. At this point the radial flange 115 will be resting on the gasket 111. At this stage a preliminary positioning and fixation of this fastener assembly FA1 is achieved by the use of a sleeve 150 having resilient, radially extending elements 155, which extend radially outwardly from the sleeve 150. In this way it is ensured that after the insertion of the fastener assembly FA1, the sleeve 150 and its radially extending elements 155 will provide sufficient holding force to prevent the fastener assembly FA1 from falling out of the opening 113 in the event of tilting of the metal surface layer 100. The further assembly steps can be performed separately and subsequently, which significantly simplifies the installation process considerably.

The sleeve 150 is integrally composed of two longitudinal sections. The first longitudinal section is subdivided by longitudinal slits that form the radially extending, resilient elements 155, which extend radially from the section 5 of the assembly 104. On the outside of the radially extending resilient elements 155, restricted areas 156 are formed which are directed against the inside of opening 113 to effect a holding force. A symmetrical, spring-like behavior is achieved by the resilient elements 155 because of their uniform circumferential arrangement around the sleeve 150. The sleeve 150 itself may be made of resilient material, and more preferably from a suitably strong yet resilient plastic. The sleeve 150 extends below the metal layer 100 but still has a clearance from the rigid body structure 103, and does not extend through the opening 113a of the rigid body structure 103. The bolt 108, however, is able to extend through the opening 113a in the rigid body structure 103.

The restricted areas 156 of the resilient elements 155 function as locking surfaces by acting as "ramps" as the sleeve 150 is pushed through the opening 113 in the metal layer 100. A slight deformation of the resilient elements 155 may occur as the sleeve is being inserted through the opening 113, after which the elements 155 re-assume their initial configuration and then portions 156 of the elements 155 exert a strong tensile force against an inner surface of the metal layer 100 around the perimeter of the opening 113. On its lower longitudinal section, the sleeve 150 has a closed range, meaning that the sleeve 150 is fixed against axial movement along the section 105 of the section 104b.

When securing the fastener assembly FA1 to the roof structure R, the resilient elements 155 are pressed or flexed (i.e. slightly deformed) when passing through the opening 113 so that they deflect radially inward. When the position is reached after FIG. 1, the resilient elements 155 automatically revert back to their shapes, which cause the restricted areas (i.e., portions) 156 to engage around the perimeter of the opening 113. In effect there is a compression of the gasket 111 as the roof rail 102 is drawn to the outer metal layer 100 of the roof structure R.

As shown in FIG. 6, the nut 114 is then placed onto the end 110 of the bolt 108. The nut 114 is then turned until the upper end of the thread 133 prevents further rotation of the nut 114 on end 110 of the bolt 108. After this point is reached, then further turning of the nut 114 causes a concurrent rotation of the 108.

At its other end 145, bolt 108 is screwed into a threaded section 144 of the section 104a. Inside of the sleeve 107 is a catch 140 disposed within a recess 107a in head portion 135. An inner edge of a hole 140a in the catch 140 is disposed radially against a cylindrical wall section 141 of the bolt 108. The catch 140 works with a limited transferable torque, i.e., as the bolt 108 starts to rotate, such rotation causes a corresponding rotation of the catch 140. It will be appreciated that the limited transferable torque is selected according to the specific application. Put differently, the torque is selected to enable the catch 140 to effectively frictionally "stick" to the shaft of the bolt 108 as the shaft begins turning during the assembly process, but then as contact of support surface 136 is made with the rigid body structure 103, the torque can be overcome by the continued application of torque to the nut 114. This transferable torque to the catch 140 is limited based on various factors including pressing force of the sleeve 107 and/or on the bolt 108. The result is a transferable friction moment in the circumferential direction, with the friction moment being limited in part based on the contact pressure and also on materials being used. The catch 140 may be designed as a frictional element adapted to be limited to a specific rotational torque, which when exceeded allows the catch 140 to rotate relative to the bolt 108. The catch 140 may be disc shaped or may take any other and made from any suitable material, for example metal, rubber, etc., that provides a desired degree of friction between it and the outer surface of the bolt 108. The catch 140 may be formed as a disc or in any other suitable shape, but it is necessary that the catch 140 is not able to rotate within the recess 107*a* as the bolt 108 is turned. As such, the recess 107*a* and catch 140 both can be shaped, for example, with a square, rectangular, triangular, hexagonal, pentagonal or oval shape. Basically any shape that "keys" the catch 140 to the recess 107*a* may be used. The dimensions of the recess 107*a* and the catch 140 may be selected to enable the catch 140 to simply be press fit into the recess 107*a* so that it is held therein preferably without any external fastening implements or adhesives.

The threaded connection 131 between the sleeve 107 and the threaded section 104*b* is opposite to the threaded connection made between end 145 of the bolt 108 and threaded section 144 of the section 104*a*. The threaded connection between the sleeve 107 and the section 104*b* is also opposite to the threaded connection made between the threaded section 133 of the bolt 108 and the threaded inside surface of the nut 114. Thus, when a right turn is performed at the thread 44 and the thread 133, to shorten the effective length of the bolt 108, as is usual with standard screws with a right-hand thread, then the threaded connection between surfaces 130 and 131 needs to be a left hand thread. This results in rotation of the bolt 108 causing the sleeve 107 to be rotated out of the threaded section 104*a* (downwardly in FIG. 2) towards the rigid body structure 103.

However, if a left turn thread is used at the threaded section 144 of the section 104*a* and at the thread 133, to shorten the effective length of the sleeve 107, then the threaded connection 131 needs to be a right hand thread, in order to enable the sleeve 107 to be moved from the section 104*b* downwardly in the drawings of FIG. 2 and FIG. 3.

This opposition of the threaded section 131/130 and 144/133 leads to the following effect. The nut 114 can be mounted on the end 110 of the bolt 108 and then rotated. It will rotate onto the short threaded section 133 of the bolt 108. When it reaches the end of the threaded section 133 the nut 114 will no longer be able to rotate relative to the bolt 108, and further rotational torque on the nut 114 will cause a corresponding rotational movement of the entire bolt 108. As the bolt 108 begins to rotate, this causes rotation of the catch 140 which is entrained by friction on the bolt 108. Rotation of the catch 140 along with the bolt 108 causes the sleeve 107 to be unscrewed from the section 104*b* of the sleeve member assembly 104 (i.e., downwardly in the drawing of FIG. 2). The sleeve 107 is screwed out from the section 104*b* due to the opposing threaded connection 131 from inside portion 105 of the section 104*b*. This unscrewing is stopped just shortly after the sleeve 107 makes initial contact with the supporting inner surface 136 of the rigid body structure 103. At this point the sleeve 107 will be applying pressure against the inside surface of the rigid body structure 103. After this point, further rotation of the bolt 108 only leads to shorten the effective length of the sleeve 107, causing a further tensioning of the section 104*a* onto the bottom wall 112 of the roof rail 102. This causes a corresponding tightening of the clamping of the bottom wall 112 of the roof rail 102 against the radial flange 115, thus securing the entire roof rail 102 securely against the metal layer 100 of the roof structure R. Advantageously, this clamping action is achieved without causing compression forces between the outer metal layer 100 and the rigid body structure 103, which would reduce the distance "A" and thus potentially cause a deformation of the metal layer 100, and thus an undesirable aesthetic concave surface area in the outer metal layer 100 to be produced around the fastener assembly FA1.

The fastener assembly FA1 provides a significant assembly advantage in that only a few operational steps are required to attach the fastener assembly FA1 to the roof structure R. After the pre-positioning of the fastener assembly FA1, the installer only needs to thread the nut 114 onto the end 110 of the bolt 108, and then begin driving the nut 114 with a suitable tool. Thus, it will be appreciated that no tool is required at end 145 of the bolt 108. As such, the fastening can be accomplished by a single worker working from one side (i.e., the side area) of the vehicle roof structure R.

Figure 10:
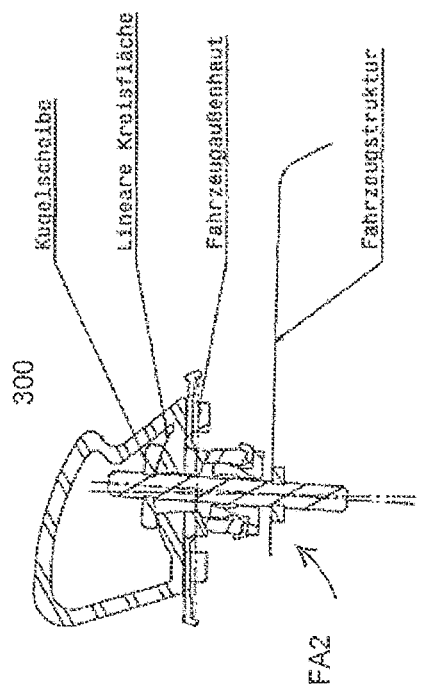
Figure 11:
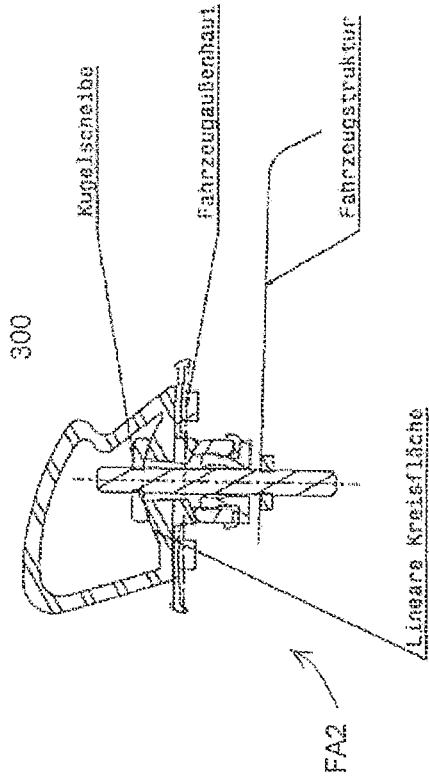

Referring to FIGS. 8 to 13, still another fastener assembly FA2 in accordance with another embodiment of the present disclosure is shown. For this, the system of threaded sleeves running counter to one another is drawn upon and extended to the effect that angular tolerances can be compensated via spherical washers, spherical surfaces (angular compensation in two planes), or for profiles also via linear circular surfaces (angular compensation in only one plane). Such elements find application both for complex formed parts such as, for example, die-cast components (FIGS. 8 and 9) and for reformed hollow roof rails (FIGS. 10 and 11). In FIGS. 8 and 9, a roof rail 200 is shown forming a support rail or slat, which is somewhat similar to roof rail 102. The roof rail 200 can also be viewed more broadly as an "add-on part". Roof rail 200, however, includes a base portion 202 having a conically shaped bore 204 and a spherically or convexly shaped bottom wall surface 206. The base portion 202 also includes a depending portion 208 having a concave shaped surface 210. A bolt 212 includes an upper end 214 having a threaded portion 216. The threaded portion 216 is threadably engaged with a threaded opening 218 in a washer-like component 220. The washer-like component 220 has a spherically shaped or concave surface 222 generally matching the shape of the convexly shaped bottom wall surface 206. Thus, the convexly shaped bottom wall surface 206 and the washer-like component 220 cooperatively form a ball and socket type configuration providing a degree of adjustable positioning of the bolt 212 in two planes.

The fastener assembly FA2 also includes counter-rotating securing assembly 224 made up of portion 226 and portion 228. Portion 228 includes a spherically or convexly shaped surface 230 which engages with the concave surface 210 in the depending portion 208, again in a generally ball-and-socket type configuration. This permits the entire portion 228 to move in two different perpendicular planes along with the bolt 212. Portions 226 and 228 are formed with, for example, left hand threads, like threaded sections 130 and 131 in the embodiment of FIG. 7, while a nut 232 is threaded to a lower portion 234 of the bolt 212 using right hand threads, like threaded section 133 and nut 114 in the embodiment of FIG. 7. This enables the portion 226 to be threaded out from the portion 228 (i.e., downwardly in the drawing of FIG. 8) as the bolt 212 is rotated in a right hand threading motion. Thus, the operation of fastener assembly FA2 is otherwise identical to that described for fastener assembly FA1.

FIG. 9 shows the bolt 212 positioned off of the axial center of the bore 204, which enables the profile 200 to be securely fastened flush against a sheet metal layer 236, which may be not be perfectly parallel to a rigid body structure 238, or where the base portion 202 has a configuration that would otherwise cause the bottom wall surface 206 to be disposed non-parallel to the sheet metal layer 236.

Figure 12:
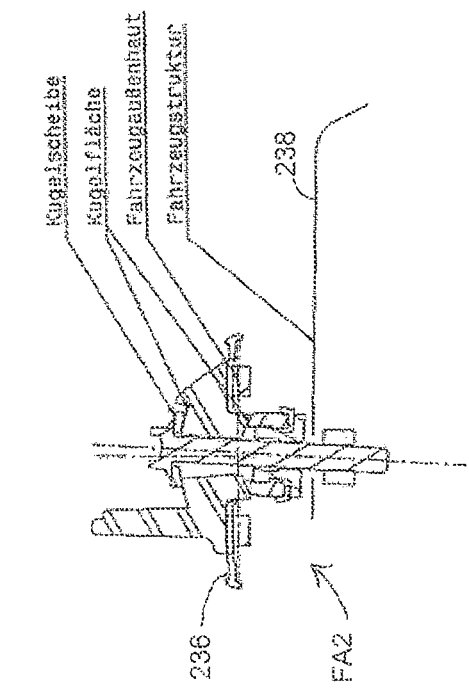
Figure 13:
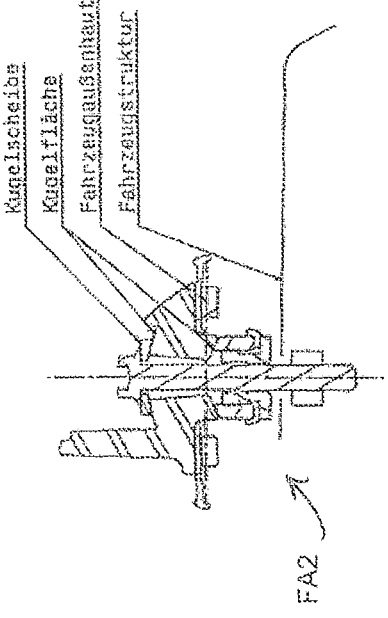

FIGS. 10-11 show a one piece formed roof rail 300, such as by extrusion, incorporating the fastener assembly FA2. FIGS. 12 and 13 show a profile 400 of slightly different configuration again employing the fastener assembly FA2, and also with the fastener assembly FA2 being employed on the outside of the vehicle (i.e., on the outside of the sheet metal layer 236).

Each of the embodiments of FIGS. 8-13 enable a degree of adjustability in the positioning of the roof rail 200, 300 or 400 relative to the bolt 212, and thus permit a degree of compensation for angular tolerances and slight axial misalignments between the openings in the sheet metal layer 236 and the rigid metal layer 238. The linear circular surfaces represented enable the roof rail 200, 300 or 400 to orient itself on the surface of the outer metal surface 236 of a vehicle roof while the fastener assembly FA2 aligns itself on the vehicle roof structure. This process may occur automatically as the fastener assembly FA2 is secured to the roof structure of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle article carrier system, comprising:
a roof rail adapted to be fastened to an outer body surface of a vehicle roof, wherein the outer body surface has an outer layer and an additional structural layer disposed elevationally below the outer layer, therein, the roof rail including a fastening assembly, the fastening assembly including:
a bolt;
a subassembly for cooperating with the bolt, the subassembly including:
an element frictionally engaged with the bolt, and able to move frictionally along a length of the bolt during a first predetermined degree of rotational movement of the bolt, to thus permit a degree of spacing between the outer layer and the additional structural layer to be taken up before the fastening assembly effects a clamping action; and
a component adapted to move linearly along the bolt toward the additional structural layer during the first predetermined degree of rotational movement of the bolt, and also during a subsequent second predetermined degree of rotational movement of the bolt, wherein during the second predetermined degree of rotational movement of the bolt, the bolt causes the component to be brought into contact with the additional structural layer to assist in generating the clamping action which clamps the roof rail to the vehicle roof.

2. The fastening assembly of claim 1, wherein:
the component comprises a first component threadably coupled to a second component using a first threaded connection; and
wherein the bolt includes a threaded section and nut threadably engaged thereon via a second threaded connection; and
wherein the first and second threaded connections have opposite rotational orientations such that one forms a right handed thread and the other forms a left handed thread.

3. The fastening assembly of claim 1, wherein the bolt includes a conical outer surface, and wherein the component includes a spreader sleeve having a plurality of arms adapted to be radially spread out by the conical outer surface as the bolt is turned during the second predetermined degree of rotational movement of the bolt, the spreader sleeve operating to assist in effecting the clamping action.

4. A vehicle article carrier system, comprising:
an roof rail system adapted to be fastened to an outer body surface of a vehicle roof, wherein the outer body surface has a recessed automotive body structure formed therein, and the roof rail includes a depending retaining foot having a cavity in communication with a bore;
a fastening assembly having a retaining foot shaped to project into the recessed automotive body structure;
a bolt dimensioned to project through the bore and through a hole in a wall portion of the recessed automotive body structure;
the bolt and the add-on component including first cooperating structure to prevent the bolt from turning within the bore while still allowing the bolt to be moved axially within the bore;
a spreader sleeve configured to fit over a portion of the bolt, with the bolt and the spreader sleeve including second cooperative structure to cause the spreader sleeve to be expanded into frictional engagement with the cavity as the bolt is moved axially through the bore and the hole;
a fastening element adapted to engage a first end of the bolt that causes axial movement of the bolt through the hole as the fastening element is turned; and
a resistive element adapted to frictionally engage with a second end of the bolt as the bolt is moved axially through the hole, the frictional engagement providing a generally constant resistive force as the bolt is axially moved through the hole and causes tightening of the add-on component against the outer body surface of the vehicle, the constant force remaining constant regardless of spacing variations between the outer body surface and the wall portion of the recessed automotive body structure.

5. The system of claim 4, wherein the resistive element comprises one of a flat washer or a metal clip.

6. The system of claim 4, wherein the resistive element comprises a ring, and wherein the second end of the bolt comprises a groove in which the ring is partially seated.

7. The system of claim 4, wherein the first cooperating structure comprises a square cross section formed within a portion of the bore of the roof rail depending retaining foot, and a similarly dimensioned square outer surface portion of the bolt.

8. The system of claim 4, wherein the second cooperating structure comprises a conical outer surface section of the bolt and a conical internal surface portion of the spreader sleeve.

9. The add-on system of claim 4, wherein the fastening element forms a threaded nut and the first end of the bolt includes a threaded portion for engaging with the threaded nut.

10. The add-on system of claim 4, further comprising an additional resistive element formed by a metal ring, and wherein the bolt includes a circumferential groove in which the metal ring is at least partially seated, the metal ring engaging with an internal surface of the cavity of the depending retaining foot and providing a generally constant resistive force during axial movement of the bolt as the fastening element is being tightened.

11. The system of claim 4, wherein the roof rail forms a portion of a vehicle article carrier system.

12. The system of claim 4, wherein a plurality of the fastening assemblies are incorporated along the roof rail.

13. A vehicle article carrier system adapted to support articles above an outer body surface of a vehicle, wherein the outer body surface has at least one recessed automotive body structure formed therein, the system including:
- a pair of elongated roof rails adapted to be positioned adjacent the outer body surface of the vehicle, at least one of the roof rails adapted to be positioned over the recessed automotive body structure when secured to the outer body surface;
- each of the roof rails having a retaining foot shaped to project into the recessed automotive body structure, the depending retaining foot including a cavity in communication with a bore;
- a fastening assembly including:
  - a bolt dimensioned to project through the bore, through the cavity and through a hole in a wall portion of the recessed automotive body structure;
  - the bolt and the depending retaining foot including interacting structure to prevent the bolt from turning within the bore while still allowing the bolt to be moved axially within the bore;
  - a fastening element adapted to engage a first end of the bolt that causes axial movement of the bolt through the hole as the fastening element is turned; and
  - a washer having a hole, the hole in the washer being dimensioned such that the washer forms a resistive element when slid over a second end of the bolt, and the washer frictionally engaging with the second end of the bolt as the bolt is moved axially through the hole, the frictional engagement providing a generally constant resistive force as the bolt is axially moved through the hole and causing tightening of the add-on component against the outer body surface of the vehicle, the constant resistive force remaining constant regardless of spacing variations between the outer body surface and the wall portion of the recessed automotive body structure.

14. The system of claim 13, further comprising a spreader sleeve configured to fit over a portion of the bolt adjacent the first end of the bolt, with the bolt and the spreader sleeve including additional cooperative structure to cause the spreader sleeve to be expanded into frictional engagement with the cavity as the bolt is moved axially through the bore and the hole when turning the fastening element.

15. The system of claim 14, wherein the additional cooperative structure includes a tapered interior surface on sections of the spreader sleeve, and a complementary shaped tapered outer surface portion on a section of the bolt.

16. The system of claim 15, wherein the sections of the spreader sleeve comprise radially expandable arm sections.

17. The system of claim 13, further comprising an additional resistive element formed as a metallic ring, and wherein the second end of the bolt includes a radial groove around a circumference thereof in which a portion of the metallic ring is disposed, the metallic ring providing a substantially constant resistive force as the fastening element is rotated.

18. The system of claim 13, wherein the fastening element comprises a threaded nut, and wherein the first end of the bolt comprises a threaded portion adapted to engage with the threaded bolt.

19. The system of claim 13, further comprising a plurality of fastening assemblies spaced apart along at least one of the roof rails.

20. The system of claim 19, wherein the support rails form a portion of a vehicle article carrier assembly.

21. A vehicle article carrier system, comprising:
- a pair of roof rails adapted to be secured to an outer body surface of a vehicle roof, wherein the outer body surface has at least one recessed automotive body structure formed therein, with one of the roof rails adapted to be secured over the recessed automotive body structure;
- each said roof rail including at least one retaining foot shaped to project into the recessed automotive body structure, the retaining foot including a cavity in communication with a bore;
- each said roof rail including a plurality of fastener systems spaced apart along the length thereof, each said fastener system including:
  - a bolt dimensioned to project through the bore and through a hole in a wall portion of the recessed automotive body structure;
  - the bolt and the retaining foot of a respective one of the roof rails including first cooperating structure to prevent the bolt from turning within the bore while still allowing the bolt to be moved axially within the bore;
  - a spreader sleeve configured to fit over a portion of the bolt, with the bolt and the spreader sleeve including second cooperative structure to cause the spreader sleeve to be expanded into frictional engagement with the cavity as the bolt is moved axially through the bore and the hole;
  - a fastening element adapted to engage a first end of the bolt that causes axial movement of the bolt through the hole as the fastening element is turned; and
  - a resistive element adapted to frictionally engage with a second end of the bolt as the bolt is moved axially through the hole, the frictional engagement providing a generally constant resistive force as the bolt is axially moved through the hole and causes tightening of the roof rail against the outer body surface of the vehicle, the constant force remaining constant regardless of spacing variations between the outer body surface and the wall portion of the recessed automotive body structure, and the fastener system enabling a single individual to tighten and secure the roof rail to the outer body surface of the vehicle by only tightening the fastening element.

22. The system of claim 21, wherein the resistive element forms one of a washer and a circumferential ring, each adapted to provide a predetermined degree of frictional engagement with the second end of the bolt.

* * * * *